United States Patent
Sul et al.

(10) Patent No.: US 11,067,323 B2
(45) Date of Patent: Jul. 20, 2021

(54) REFRIGERATOR AND METHOD OF OPERATING THE SAME

(71) Applicant: LG ELECTRONICS INC., Seoul (KR)

(72) Inventors: Heayoun Sul, Seoul (KR); Minkyu Oh, Seoul (KR); Hyoungkeun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 181 days.

(21) Appl. No.: 16/027,820

(22) Filed: Jul. 5, 2018

(65) Prior Publication Data

US 2019/0011158 A1    Jan. 10, 2019

(30) Foreign Application Priority Data

Jul. 5, 2017    (KR) .................. 10-2017-0085577

(51) Int. Cl.
*F25B 49/02*    (2006.01)
*F25B 13/00*    (2006.01)
(Continued)

(52) U.S. Cl.
CPC .............. *F25B 49/022* (2013.01); *F25B 5/02* (2013.01); *F25B 13/00* (2013.01); *F25B 49/02* (2013.01);
(Continued)

(58) Field of Classification Search
CPC .. F25D 17/065; F25D 11/04; F25D 2700/121; F25B 5/02; F25B 2341/0661; F25B 2400/06

See application file for complete search history.

(56) References Cited

U.S. PATENT DOCUMENTS 3,403,533 A * 10/1968 Bollenbacher ........ F25D 17/065
                                                      62/408
5,899,083 A *  5/1999 Peterson ............... F25D 17/045
                                                      62/186

(Continued)

FOREIGN PATENT DOCUMENTS

KR    10-0594423    7/2006
KR    10-0550581    9/2006

*Primary Examiner* — Frantz F Jules
*Assistant Examiner* — Lionel Nouketcha
(74) *Attorney, Agent, or Firm* — KED & Associates LLP (57) ABSTRACT

A refrigerator includes a first freezing cycle in which a first refrigerant circulates and having a first compressor, a first condenser, at least one first expansion mechanism, and at least one first evaporator, the first freezing cycle configured to cool freezing and refrigerating compartments, a freezing compartment sensor, a refrigerating compartment sensor, a second freezing cycle in which a second mixed refrigerant having a lower evaporation temperature than the first refrigerant circulates and having a second compressor, a second condenser, a second expansion mechanism, and a second evaporator, the second freezing cycle configured to cool a deep freezing compartment, a deep freezing compartment sensor, and a controller configured to operate the first freezing cycle and the second freezing cycle independently or simultaneously, thereby more efficiently cooling the freezing and refrigerating compartments and the deep freezing compartment.

13 Claims, 6 Drawing Sheets

(51) Int. Cl.
*F25B 5/02* (2006.01)
*F25D 19/04* (2006.01)
*F25D 11/04* (2006.01)
*F25D 17/06* (2006.01)
*F25D 17/04* (2006.01)
*F25B 41/385* (2021.01)

(52) U.S. Cl.
CPC ............ *F25D 11/04* (2013.01); *F25D 17/065* (2013.01); *F25D 19/04* (2013.01); *F25B 41/385* (2021.01); *F25B 2341/062* (2013.01); *F25B 2400/06* (2013.01); *F25B 2600/0251* (2013.01); *F25B 2600/111* (2013.01); *F25B 2700/2104* (2013.01); *F25D 17/045* (2013.01); *F25D 2317/0666* (2013.01); *F25D 2700/12* (2013.01); *F25D 2700/121* (2013.01); *F25D 2700/122* (2013.01)

(56) References Cited

U.S. PATENT DOCUMENTS

| | | | | |
|---|---|---|---|---|
| 7,299,653 | B2* | 11/2007 | Kurita | C09K 5/042 |
| | | | | 62/114 |
| 8,091,381 | B2* | 1/2012 | Boiarski | F25B 7/00 |
| | | | | 62/498 |
| 9,160,258 | B2* | 10/2015 | Rockenfeller | H02P 1/30 |
| 9,436,377 | B2* | 9/2016 | Hyun | F25D 29/00 |
| 9,759,473 | B2* | 9/2017 | Kim | F25D 11/022 |
| 10,094,610 | B2* | 10/2018 | Sexton | F25D 17/045 |
| 2009/0001866 | A1* | 1/2009 | Kaga | F25B 49/027 |
| | | | | 312/401 |
| 2014/0013779 | A1* | 1/2014 | Cho | F25D 29/00 |
| | | | | 62/56 |
| 2014/0290303 | A1* | 10/2014 | Shin | F25D 17/065 |
| | | | | 62/419 |

* cited by examiner

REFRIGERATOR AND METHOD OF OPERATING THE SAME

CROSS-REFERENCE TO RELATED APPLICATION(S)

The present application claims priority under 35 U.S.C. 119 and 35 U.S.C. 365 to Korean Patent Application No. 10-2017-0085577 (filed on Jul. 5, 2017), which is hereby incorporated by reference in its entirety.

BACKGROUND

1. Field

A refrigerator and a method of operating a refrigerator are disclosed herein.

2. Background

A refrigerator may be an apparatus that stores an object to be cooled such as foods, medicines, and cosmetics, for example, at a low temperature to prevent the object to be cooled from rotting or spoiling. The refrigerator may include a storage compartment configured to store objects and a cooling device configured to cool the storage compartment.

The cooling device may include a compressor, a condenser, an expansion mechanism, and an evaporator, in which refrigerant circulates. The refrigerator may include a freezing compartment maintained at a subzero temperature range and a refrigerating compartment maintained at an above-zero temperature range. The freezing compartment and the refrigerating compartment may be cooled by at least one evaporator.

The refrigerator may further include a deep freezing space having a temperature range lower than the temperature range (e.g., −16° C. to −20° C.) of the freezing compartment. In this case, the deep freezing space may be maintained at a lower temperature than the freezing compartment or the refrigerating compartment.

An example of a refrigerator having a deep freezing space may be a deep freezing system capable of cooling a deep freezing space using a dual cycle including a high-temperature cycle part and a low-temperature cycle part, which is disclosed in Korean Registered Patent Publication No. 10-0594423 B1 (published on Jul. 3, 2006). In the deep freezing system using the dual cycle, when a compressor of the low-temperature cycle part is driven, a compressor of the high-temperature cycle part may be driven so that an evaporator of the low-temperature cycle part may cool the insides of the compartments to a sufficiently low temperature.

In addition, only a storage compartment having a deep freezing temperature range may be cooled by the evaporator of the low-temperature cycle part. Therefore, it may be difficult to simultaneously cool a plurality of storage compartments having various temperature ranges.

BRIEF DESCRIPTION OF THE DRAWINGS

Embodiments will be described in detail with reference to the following drawings in which like reference numerals refer to like elements, and wherein.

DETAILED DESCRIPTION

Figure 1:
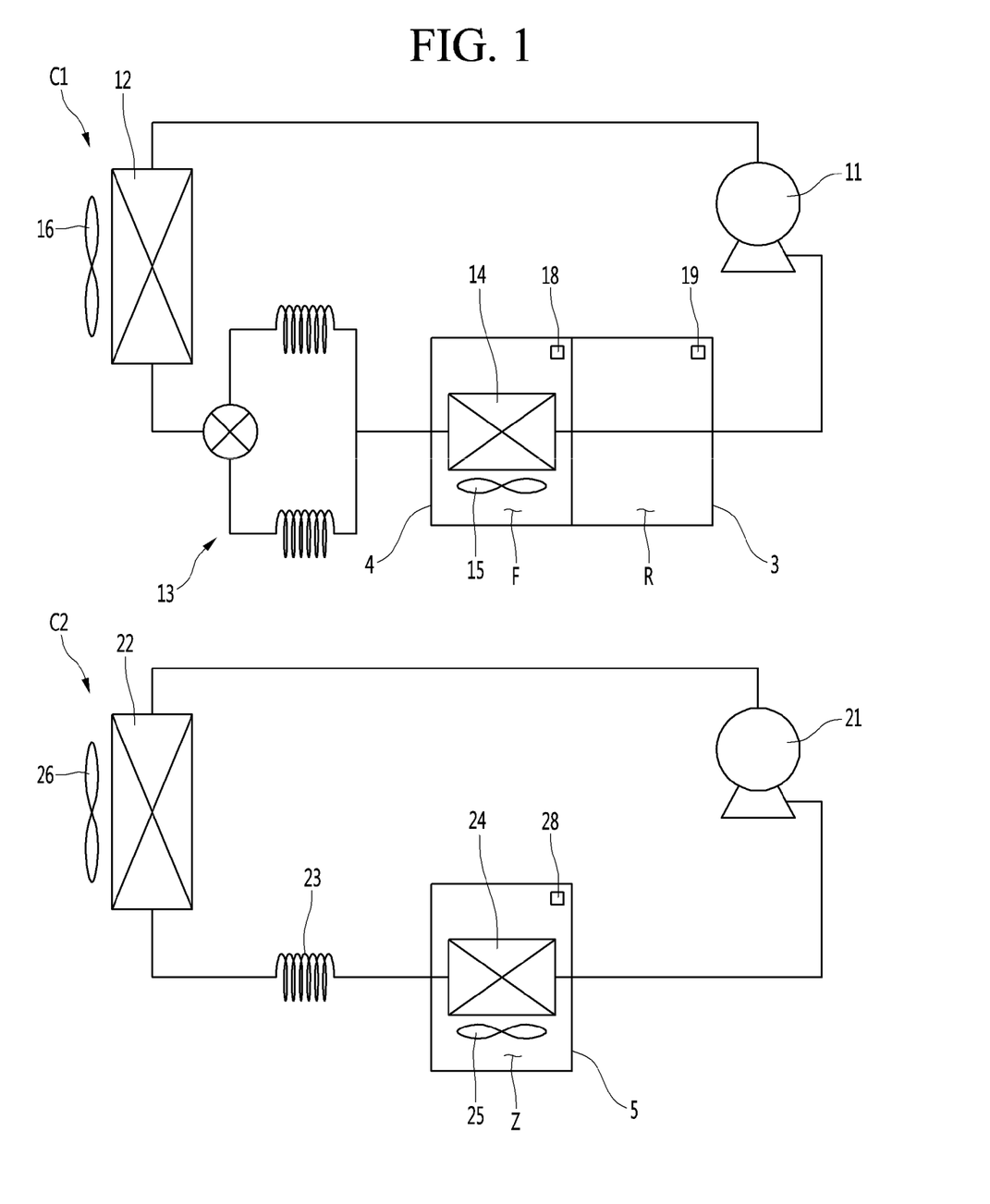
FIG. 1 illustrates a configuration of a refrigerator according to an embodiment.
Figure 2:
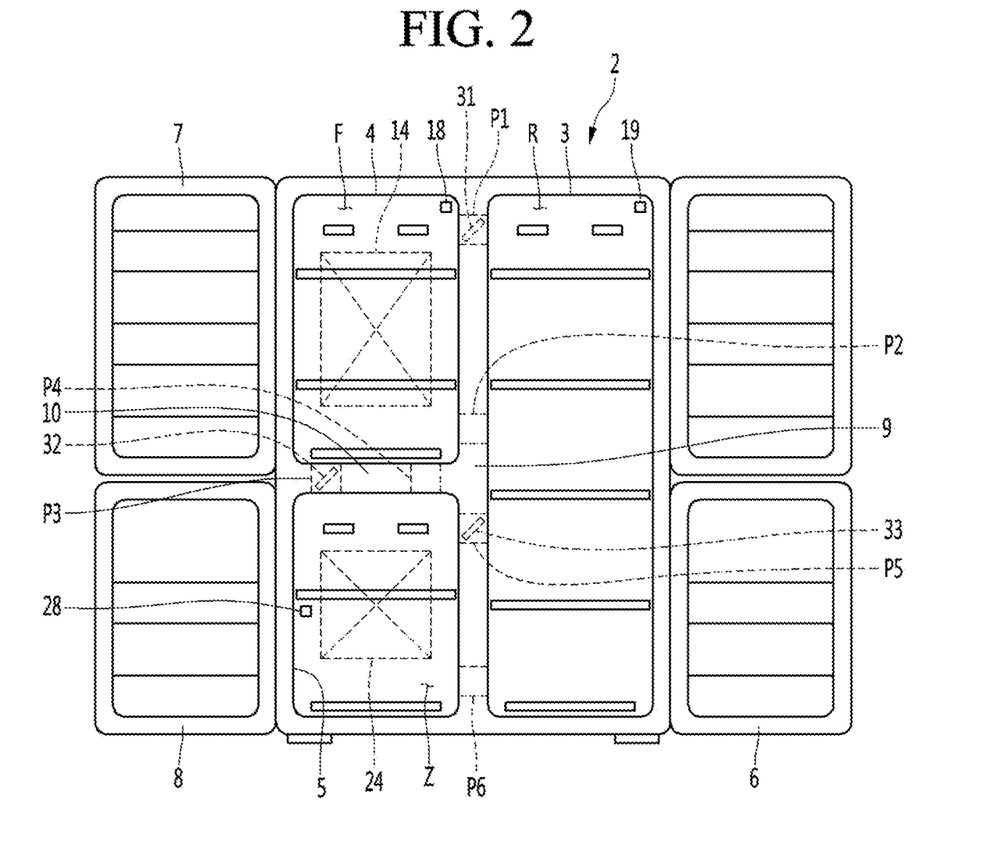
FIG. 2 is a front view showing a freezing compartment, a refrigerating compartment, and a deep freezing compartment of the refrigerator according to an embodiment.
Figure 3:
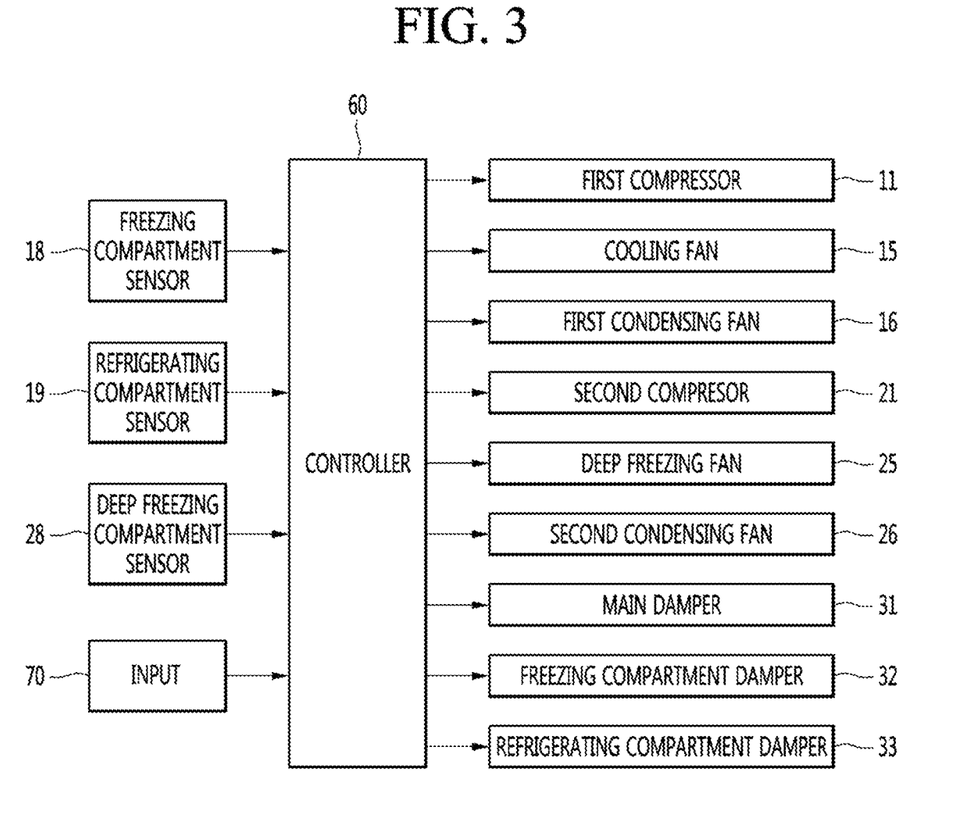
FIG. 3 is a control block diagram of the refrigerator according to an embodiment.

FIG. 1 illustrates a configuration of a refrigerator according to an embodiment, FIG. 2 is a front view showing a freezing compartment, a refrigerating compartment, and a deep freezing compartment of the refrigerator, and FIG. 3 is a control block diagram of the refrigerator. The refrigerator may include a freezing compartment F, a refrigerating compartment R, and a deep freezing compartment Z.

The freezing compartment F and the refrigerating compartment R may each be a non-deep-freezing compartment having a higher temperature range than the deep freezing compartment Z. The deep freezing compartment Z may be partitioned from both the freezing compartment F and the refrigerating compartment R. The deep freezing compartment Z may have a lower temperature range than the freezing compartment F and the refrigerating compartment R.

The refrigerating compartment R may be a storage compartment having an above-zero temperature range. The freezing compartment F may be a storage compartment having a subzero temperature range higher than the temperature range of the deep freezing compartment.

The deep freezing compartment Z may be a storage compartment having a lower temperature range than the freezing compartment F. For example, the freezing compartment F may be cooled by a first freezing cycle C1 to a temperature range of −16° C. to −20° C. In contrast, the deep freezing compartment Z may not be cooled by the first freezing cycle C1, and may be cooled by a second freezing cycle C2 different from the first freezing cycle C1 to a temperature range of −40° C. to −70° C.

If the refrigerator includes the deep freezing compartment Z having a lower temperature range than the freezing compartment F, foods having juices, such as meat or fish, may be stored in the deep freezing compartment Z, and a drip loss of meat stored in the deep freezing compartment Z having the temperature range of −40° C. to −70° C. may be minimized. The volume of the deep freezing compartment Z may be less than or equal to the volume of the freezing compartment F. The volume of the deep freezing compartment Z may be less than the volume of the refrigerating compartment R.

The refrigerator may include a main body 2 in which the freezing compartment F, the refrigerating compartment R, and the deep freezing compartment Z are formed. The freezing compartment F, the refrigerating compartment R and the deep freezing compartment Z may be partitioned in one main body 2.

The main body 2 may include a refrigerating compartment case 3 in which the refrigerating compartment R is formed and a freezing compartment case 4 in which the freezing compartment F is formed. The main body 2 may further include a deep freezing compartment case 5 in which the deep freezing compartment Z is formed.

The deep freezing compartment case 5 may be located outside of the refrigerating compartment case 3 and the freezing compartment case 4, separately from the refrigerating compartment case 3 and the freezing compartment case 4.

The refrigerator may include at least two doors 6 and 7. In this case, the refrigerator may include a first door 6 configured to open and close any one of the refrigerating compartment R and the freezing compartment F, and a second door 7 configured to open and close the other of the refrigerating compartment R and the freezing compartment F along with the deep freezing compartment Z.

The refrigerator may include three doors 6, 7 and 8. In this case, the refrigerator may include the first door 6 configured to open and close the refrigerating compartment R, the second door 7 configured to open and close the freezing compartment F, and a third door 8 configured to open and close the deep freezing compartment Z.

The refrigerator may include the first freezing cycle C1 configured to cool the freezing compartment F and the refrigerating compartment R and the second freezing cycle C2 configured to cool the deep freezing compartment Z. The first freezing cycle C1 and the second freezing cycle C2 may be independently configured without mixing refrigerant. The first freezing cycle C1 and the second freezing cycle C2 may be independent cycles which are not connected to each other by a heat exchanger such as a cascade heat exchanger or a refrigerant tube.

In addition, the refrigerant of the first freezing cycle C1 and the refrigerant of the second freezing cycle C2 may be different from each other. The first freezing cycle C1 may include a first compressor 11, a first condenser 12, at least one first expansion mechanism 13, and at least one first evaporator 14, in which a first refrigerant circulates. The first freezing cycle C1 may cool the freezing compartment F and the refrigerating compartment R. The first expansion mechanism 13 may be a capillary tube. The first refrigerant may be used in a general refrigerator and may be, for example, R-134A, etc.

The refrigerator may further include a cooling fan 15 configured to circulate air in the freezing compartment F and the first evaporator 14. The refrigerator may further include a first condensing fan 16 configured to blow air outside the refrigerator to the first condenser 12.

The refrigerator may further include a freezing compartment sensor 18 configured to sense a freezing compartment temperature and a refrigerating compartment sensor 19 configured to sense a refrigerating compartment temperature. The first freezing cycle C1 may operate according to the freezing compartment temperature sensed by the freezing compartment sensor 18 and the refrigerating compartment temperature sensed by the refrigerating compartment sensor 19, if simultaneous operation is not performed.

The second freezing cycle C2 may include a second compressor 21, a second condenser 22, a second expansion mechanism 23, and a second evaporator 24, in which a second refrigerant circulates. The second freezing cycle C2 may cool the deep freezing compartment Z, and the second refrigerant may be a mixed refrigerant having a lower evaporation temperature than the first refrigerant. The second expansion mechanism 23 may be a capillary tube.

The second compressor 21 may have a maximum discharge temperature of 120° C. or less, maximum discharge pressure of 25 bars or less, and minimum suction pressure of 1 bar or less. The second compressor 21 may be configured so as to not generate much noise. The mixed refrigerant circulated in the second freezing cycle C1 may be non-azeotropic mixed refrigerant. The mixed refrigerant may include refrigerant having a first boiling point and refrigerant having a second boiling point lower than the first boiling point. The refrigerant having the first boiling point may be high-temperature refrigerant and the refrigerant having the second boiling point may be low-temperature refrigerant.

As described above, in the second freezing cycle, the pressure of the mixed refrigerant discharged from the second compressor 21 may be kept within a set range while the mixed refrigerant maintains an evaporation temperature required in the deep freezing compartment Z which is obtained by mixing the high-temperature refrigerant and the low-temperature refrigerant having different boiling points. The second freezing cycle C2 may be maintained at a deep freezing range of −40° C. to −70° C. by the characteristics of the low-temperature refrigerant of the mixed refrigerant.

The low-temperature refrigerant may have a relatively high discharge pressure upon being compressed in the second compressor 21, and the mixed refrigerant may be obtained by mixing the high-temperature refrigerant having a relatively lower discharge pressure than the low-temperature refrigerant in order to lower the discharge pressure of the mixed refrigerant discharged from the second compressor 21. The high-temperature refrigerant of the mixed refrigerant may be at least one of isopentane, 1,2-butadiene, N-butane, 1-butane and isobutane.

The physical properties of the high-temperature refrigerant are shown in Table 1.

TABLE 1

| high-temperature refrigerant | Evaporation temperature (1 bar), ° C. | Evaporation temperature (20 bar), ° C. |
| --- | --- | --- |
| isopentane | 27.5 | 154.7 |
| 1,2-butadiene | 10.3 | 124.8 |
| N-butane | −0.9 | 114.5 |
| 1-butane | −6.6 | 105.8 |
| isobutane | −12 | 100.7 |

At a pressure of 1 bar, isopentane and 1,2-butadiene may have a relatively high evaporation temperature and, when isopentane and 1,2-butadiene are used as the high-temperature refrigerant of the present embodiment, it may not easy to form the deep freezing temperature of −40° C. to −70° C. In contrast, at a pressure of 1 bar, N-butane, 1-butane and isobutane may have evaporation temperatures of 0° C. or less. N-butane, 1-butane and isobutane may be used as the high-temperature refrigerant of the mixed refrigerant of the embodiment.

1-butane and isobutene may have low evaporation temperatures. Therefore, 1-butane and isobutene may aid in forming the deep freezing temperature of −40° C. to −70° C. but may increase the discharge pressure of the second compressor 21, when being mixed with the low-temperature refrigerant.

Thus, in the case of the pressure of 1 bar, N-butane having an evaporation temperature close to 0° C. may be used as the high-temperature refrigerant of the mixed refrigerant of the present embodiment. The low-temperature refrigerant of the mixed refrigerant may be at least one of ethane and ethylene.

The physical properties of the low-temperature refrigerant are shown in Table 2.

TABLE 2

| low-temperature refrigerant | Evaporation temperature (1 bar), ° C. | Evaporation temperature (20 bar), ° C. |
| --- | --- | --- |
| Ethane | −88.8 | −182.8 |
| Ethylene | −104 | −169.15 |

At a pressure of 1 bar, ethane may have a relatively high evaporation temperature and ethylene may have a relatively low evaporation temperature. If the temperature range of the deep freezing compartment Z is close to −40° C., ethane having a relatively high evaporation temperature may be used and, if the temperature range of the deep freezing compartment Z is close to −70° C., ethylene having a relatively low evaporation temperature may be used.

The mixed refrigerant may be obtained by mixing the high-temperature refrigerant and the low-temperature refrigerant at an appropriate ratio. When N-butane is used as the high-temperature refrigerant and ethylene is used as the low-temperature refrigerant, an experimental result of obtaining the maximum discharge pressure (bar), the minimum suction pressure (bar), the maximum discharge temperature (° C.) and the temperature of the deep freezing compartment Z according to weight % is shown in Table 3.

TABLE 3

| | Room temperature (32° C.) | | | | |
| --- | --- | --- | --- | --- | --- |
| N-Butane/Ethylene (weight %) | 70/30 | 75/25 | 80/20 | 85/15 | 90/10 |
| Maximum discharge pressure (bar) | 39.1 | 36.2 | 24.3 | 22.9 | 21.4 |
| Minimum suction pressure (bar) | 1.7 | 1.5 | 1.18 | 1.09 | 0.94 |
| Maximum discharge temperature (° C.) | 116.9 | 111.2 | 105.4 | 101.3 | 98.6 |
| Temperature of deep freezing compartment (° C.) | −79.8 | −74.6 | −68.3 | −62.9 | −55.8 |

The result values shown in Table 3 are obtained under the condition that the room temperature (ambient temperature) is 32° C. Referring to Table 3, in the case of the mixed refrigerant of N-butane and ethylene, it can be seen that, as the weight % of N-butane increases, the maximum discharge pressure, minimum suction pressure and maximum discharge temperature of the compressor may decrease and the temperature of the deep freezing compartment Z may increase.

When a ratio of N-Butane to ethylene is 75:25 to 90:10, the temperature of the deep freezing compartment Z may be −74.6° C. to −55.8° C., and the ratio of N-Butane to ethylene configuring the mixed refrigerant may be 75:25 to 90:10. The refrigerator may further include a deep freezing fan 25 configured to circulate air in the deep freezing compartment Z and the second evaporator 24. The refrigerator may further include a second condensing fan 26 configured to blow air from an outside of the refrigerator to the second condenser 22. The refrigerator may further include a deep freezing compartment sensor 28 configured to sense a deep freezing compartment temperature.

The second freezing cycle C2 may operate according to the deep freezing compartment temperature sensed by the deep freezing compartment sensor 28, if simultaneous operation is not performed. The refrigerator may further include a controller 60 that operates the first freezing cycle C1 and the second freezing cycle C2. The refrigerator may further include an input unit (or input) 70 that allows a user to input an operation of the refrigerator.

The controller 60 may independently operate the first freezing cycle C1 according to at least one of the freezing compartment temperature sensed by the freezing compartment sensor 18 and the refrigerating compartment temperature sensed by the refrigerating compartment sensor 19, and independently operate the second freezing cycle C2 according to the deep freezing compartment temperature sensed by the deep freezing compartment sensor. The controller 60 may independently operate the first freezing cycle C1 and the second freezing cycle C2 if a simultaneous operation condition is not satisfied.

Operation of the first freezing cycle C1 may include driving the first compressor 11. In addition, operation of the second freezing cycle C2 may include driving the second compressor 21. In the first freezing cycle C1, the first compressor 11 may be driven if the freezing compartment temperature sensed by the freezing compartment sensor 18 is above a freezing compartment dissatisfaction temperature and may be stopped if the freezing compartment temperature sensed by the freezing compartment sensor 18 is below a freezing compartment satisfaction temperature.

The freezing compartment dissatisfaction temperature may be a temperature higher than a freezing compartment target temperature (e.g., −18° C.) by a set or predetermined temperature (e.g., 0.5° C.). In addition, the freezing compartment satisfaction temperature may be a temperature lower than the freezing compartment target temperature (e.g., −18° C.) by a set or predetermined temperature (e.g., 0.5° C.).

In the second freezing cycle C2, the second compressor 12 may be driven if the deep freezing compartment temperature sensed by the deep freezing compartment sensor 28 is above a deep freezing compartment dissatisfaction temperature and may be stopped if the freezing compartment temperature sensed by the freezing compartment sensor 18 is below a deep freezing compartment satisfaction temperature. The deep freezing compartment dissatisfaction temperature may be a temperature higher than a deep freezing compartment target temperature (e.g., −50° C.) by a set or predetermined temperature (e.g., 1° C. or 2° C.). In addition, the deep freezing compartment satisfaction temperature may be a temperature lower than the deep freezing compartment target temperature (e.g., −50° C.) by a set or predetermined temperature (e.g., 1° C. or 2° C.).

In the independent operation, the second freezing cycle C2 may be controlled separately from the first freezing cycle C1. The second freezing cycle C2 may operate simultaneously with the first freezing cycle C1 when the refrigerator is under a special operation condition. That is, the controller 60 may perform a simultaneous operation of the first freezing cycle C1 and the second freezing cycle C2. In this case, the refrigerator may improve a load coping speed by simultaneous cooling using the first freezing cycle C1 and the second freezing cycle C2.

When the refrigerator includes the freezing compartment F, the refrigerating compartment R and the deep freezing compartment Z, the refrigerating compartment R may be larger than the freezing compartment F and the refrigerating compartment R may be larger than the deep freezing compartment Z. Referring to FIG. 2, the refrigerator may further include a first barrier 9 that partitions the freezing compartment F and the deep freezing compartment Z from the refrigerating compartment R, and a second barrier 10 that partitions the deep freezing compartment Z from the freezing compartment F.

The refrigerator may include main circulation passages P1 and P2, through which cool air circulates between the freezing compartment F and the refrigerating compartment R. The main circulation passages P1 and P2 may include a main inflow passage P1, through which cool air of the freezing compartment F flows into the refrigerating compartment R, and the main outflow passage P2, through which cool air of the refrigerating compartment R flows into the freezing compartment F.

The main inflow passage P1 and the main outflow passage P2 may be formed in the first barrier 9. The main inflow passage P1 and the main outflow passage P2 may be communication passages that allow communication between the freezing compartment F and the refrigerating compartment R. Cool air of the freezing compartment F may flow into the refrigerating compartment R through the main inflow passage P1, and cool air of the refrigerating compartment R may flow into the freezing compartment F through the main outflow passage P2.

The refrigerator may further include a main damper 31 provided in one of the main circulation passages P1 and P2 between the freezing compartment F and the refrigerating compartment R to control cool air. The main damper 31 may be arranged in each of the main inflow passage P1 and the main outflow passage P2. The main damper 31 may guide cool air of the freezing compartment F to flow into the refrigerating compartment R upon being opened and prevent circulation of cool air between the freezing compartment F and the refrigerating compartment R upon being closed.

When the main damper 31 is opened, the freezing compartment F and the refrigerating compartment R may communicate with each other, and cool air of the freezing compartment F may flow into the refrigerating compartment R to cool the refrigerating compartment R. When the main damper 31 is closed, the freezing compartment F and the refrigerating compartment R may be blocked from each other.

The refrigerator may include freezing compartment circulation passages P3 and P4, through which cool air circulates between the deep freezing compartment Z and the freezing compartment F. The freezing compartment circulation passages P3 and P4 may include a freezing compartment inflow passage P3, through which cool air of the deep freezing compartment Z may flow into the freezing compartment F, and the freezing compartment outflow passage P4, through which cool air of the freezing compartment F may flow into the deep freezing compartment Z.

The freezing compartment inflow passage P3 and the freezing compartment outflow passage P4 may be formed in the second barrier 10. The freezing compartment inflow passage P3 and the freezing compartment outflow passage P4 may be communication passages that allow communication between the deep freezing compartment Z and the freezing compartment F. Cool air of the deep freezing compartment Z may flow into the freezing compartment F through the freezing compartment inflow passage P3, and cool air of the freezing compartment F may flow into the deep freezing compartment Z through the freezing compartment outflow passage P4.

The refrigerator may further include a freezing compartment damper 32 provided in one of the freezing compartment circulation passages P3 and P4 between the deep freezing compartment Z and the freezing compartment F to control cool air. The freezing compartment damper 32 may be arranged in each of the freezing compartment inflow passage P3 and the freezing compartment outflow passage P4. The freezing compartment damper 32 may guide cool air of the deep freezing compartment Z to flow into the freezing compartment F upon being opened and prevent circulation of cool air between the deep freezing compartment Z and the freezing compartment F upon being closed.

When the freezing compartment damper 32 is opened, the deep freezing compartment Z and the freezing compartment F may communicate with each other, cool air of the deep freezing compartment Z may flow into the freezing compartment F to rapidly cool the freezing compartment F. When the freezing compartment damper 32 is closed, the deep freezing compartment Z and the freezing compartment F may be blocked from each other, and the deep freezing compartment Z and the freezing compartment F may be independently cooled.

The refrigerator may include refrigerating compartment circulation passages P5 and P6, through which cool air may circulate between the deep freezing compartment Z and the refrigerating compartment R. The refrigerating compartment circulation passages P5 and P6 may include the refrigerating compartment inflow passage P5, through which cool air of the deep freezing compartment Z may flow into the refrigerating compartment R, and the refrigerating compartment outflow passage P6, through which cool air of the refrigerating compartment R may flow into the deep freezing compartment Z.

The refrigerating compartment inflow passage P5 and the refrigerating compartment outflow passage P6 may be formed in the first barrier 9. The refrigerating compartment inflow passage P5 and the refrigerating compartment outflow passage P6 may be communication passages that allow communication between the deep freezing compartment Z and the refrigerating compartment R. Cool air of the deep freezing compartment Z may flow into the refrigerating compartment R through the refrigerating compartment inflow passage P5, and cool air of the refrigerating compartment R may flow into the deep freezing compartment Z through the refrigerating compartment outflow passage P6.

The refrigerator may further include a refrigerating compartment damper 33 provided in one of the refrigerating compartment circulation passages P5 and P6 between the deep freezing compartment Z and the refrigerating compartment F to control cool air. The refrigerating compartment damper 33 may be arranged in each of the refrigerating compartment inflow passage P5 and the refrigerating compartment outflow passage P6. The refrigerating compartment damper 33 may guide cool air of the deep freezing compartment Z to flow into the refrigerating compartment R upon being opened and prevent circulation of cool air between the deep freezing compartment Z and the refrigerating compartment R upon being closed.

When the refrigerating compartment damper 33 is opened, the deep freezing compartment Z and the refrigerating compartment R may communicate with each other, cool air of the deep freezing compartment Z may flow into the refrigerating compartment R to rapidly cool the refrigerating compartment R. When the refrigerating compartment damper 33 is closed, the deep freezing compartment Z and the refrigerating compartment R may be blocked from each other, and the deep freezing compartment Z and the refrigerating compartment R may be independently cooled.

The refrigerator may have a simultaneous operation condition for simultaneously operating the first freezing cycle C1 and the second freezing cycle C2. Such a simultaneous operation condition may be applicable to various examples. As an example of the simultaneous operation condition, at least one of the freezing compartment F and the refrigerating compartment R may be in a load coping condition. As another example of the simultaneous operation condition, at least one of the freezing compartment temperature and the refrigerating compartment temperature may be in an upper limit range. As another example of the simultaneous operation condition, a rapid cooling operation may be input by a user.

Figure 4:
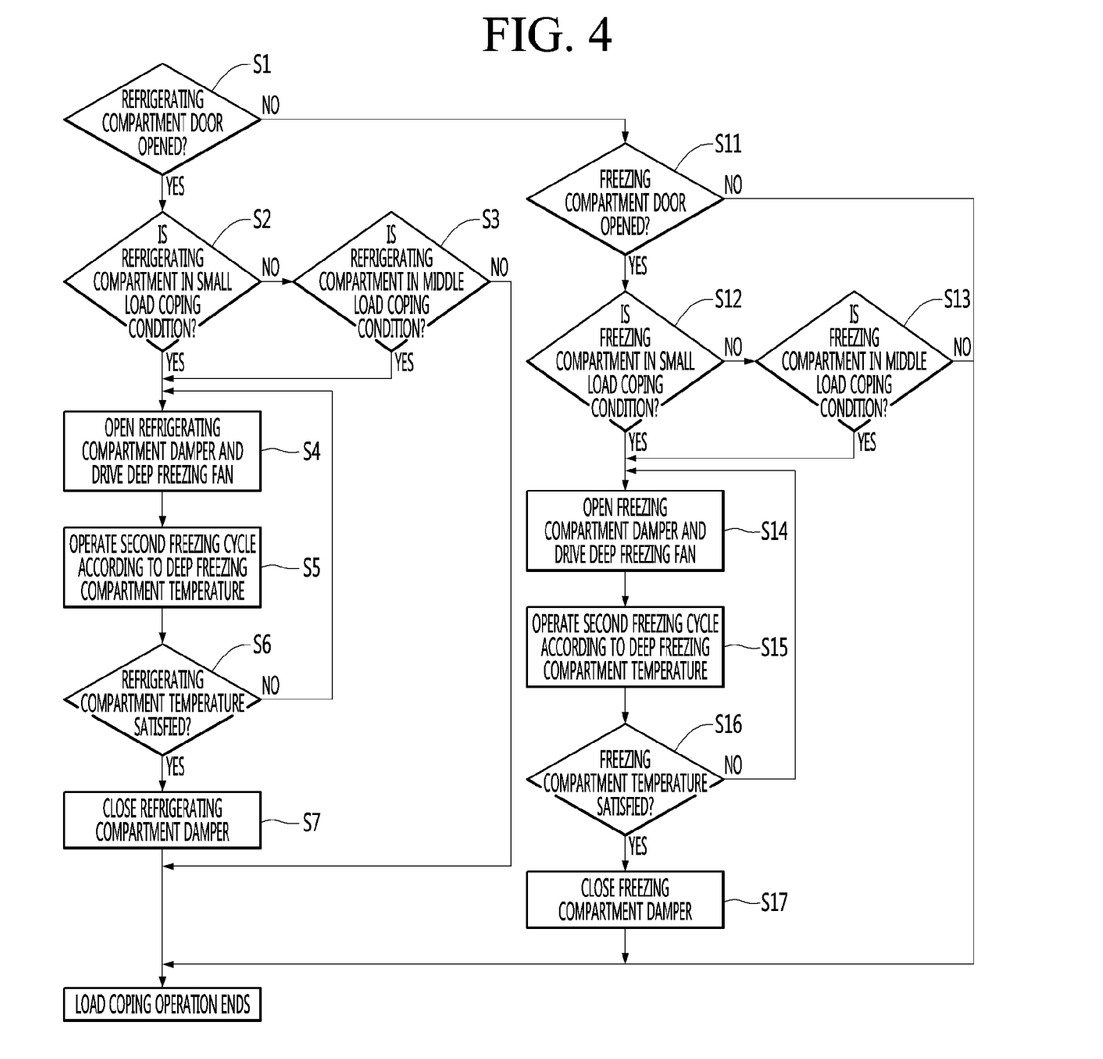
FIG. 4 is a flowchart showing an example of a method of controlling a refrigerator according to an embodiment.

The controller 60 may simultaneously operate the first freezing cycle C1 and the second freezing cycle C2 when any one of a plurality of simultaneous operation conditions is satisfied. FIG. 4 is a flowchart showing an example of a method of controlling the refrigerator according an embodiment. The controller 60 may perform a simultaneous operation when at least one of the freezing compartment F and the refrigerating compartment is in a load coping condition.

When the user opens the first door 6 or the second door 7, the controller 60 may determine whether at least one of the freezing compartment F and the refrigerating compartment is in a load coping condition from temperature change of the refrigerating compartment R or temperature change of the freezing compartment F (S1, S2, S3, S11, S12 and S13). The controller 60 may control the refrigerator such that cool air of the deep freezing compartment Z flows into the freezing compartment F or the refrigerating compartment R, under the load coping condition.

Here, the load coping condition may be any one of a small load coping condition and a middle load coping condition. A door small load coping condition may indicate the case in that after the door is opened and then closed, the temperature of the storage compartment, the door of which is opened and closed, increases by a first set temperature (e.g., 2° C.) or more within a first set time (e.g., 5 minutes).

For example, when the temperature sensed by the refrigerating compartment sensor 19 increases by the first set temperature or more within the first set time after the user opens and then closes the first door 6, the controller 60 may determine that the refrigerating compartment R is in a small load coping condition (S1 and S2). As another example, when the temperature sensed by the freezing compartment sensor 18 increases by the first set temperature or more within the first set time after the user opens and then closes the second door 7, the controller 60 may determine that the freezing compartment F is in a small load coping condition (S11 and S12).

A middle load coping condition may indicate the case in that after the door is opened and then closed, the temperature of the storage compartment, the door of which is opened and closed, increases by a second set temperature (e.g., 8° C.) or more as compared to a target temperature within a second set time (e.g., 20 minutes). The second set time may be longer than the first set time. The second set temperature may be higher than the first set temperature.

For example, when the temperature sensed by the refrigerating compartment sensor 19 increases by the second set temperature or more as compared to the refrigerating compartment target temperature within the second set time after the user opens and then closes the first door 6, the controller 60 may determine that the refrigerating compartment R is in a middle load coping condition (S1 and S3). As another example, when the temperature sensed by the freezing compartment sensor 18 increases by the second set temperature or more as compared to the freezing compartment target temperature within the second set time after the user opens and then closes the second door 7, the controller 60 may determine that the freezing compartment F is in a middle load coping condition (S11 and S13).

Hereinafter, the load coping operation of the refrigerating compartment will be described. The controller 60 may open the refrigerating compartment damper 33 such that cool air of the deep freezing compartment Z flows into the refrigerating compartment R and drive the deep freezing fan 25 (S4), if the refrigerating compartment R is in a load coping condition. When the refrigerating compartment damper 33 is opened, cool air of the deep freezing compartment Z may move to the refrigerating compartment R to flow into the refrigerating compartment R, thereby rapidly cooling the refrigerating compartment R by cool air flowing from the deep freezing compartment Z.

The deep freezing fan 25 may aid the cool air of the deep freezing compartment Z in flowing more rapidly into the refrigerating compartment R when the refrigerating compartment damper 33 is opened. The refrigerating compartment R may be more rapidly cooled as compared to the case where the deep freezing fan 25 is stopped.

When the refrigerating compartment damper 33 is opened and the deep freezing fan 25 is driven, some of cool air of the refrigerating compartment R may flow into the deep freezing compartment Z and the temperature of the deep freezing compartment Z may increase by cool air that then flows from the refrigerating compartment R into the deep freezing compartment Z.

The controller 60 may stop driving the second compressor 21 according to the temperature sensed by the deep freezing compartment sensor 28 while the refrigerating compartment damper 33 is opened and the deep freezing fan 25 is driven (S5). The controller 60 may drive the second compressor 21 when the temperature sensed by the deep freezing compartment sensor 28 is above the deep freezing dissatisfaction temperature and stop the second compressor 21 when the temperature sensed by the deep freezing compartment sensor 28 is below the deep freezing satisfaction temperature.

In the above-described control, the load of the refrigerating compartment R may be rapidly eliminated by cool air flowing from the deep freezing compartment Z, and the temperature of the deep freezing compartment Z may be kept at a low temperature.

The temperature of the refrigerating compartment R may reach the refrigerating compartment satisfaction temperature by opening the refrigerating compartment damper 33 and driving the deep freezing fan 25, and the controller 60 may close the refrigerating compartment damper 33 so as not to supercool the refrigerating compartment R. In the above-described control, a load caused by opening and then closing the first door 6 may be eliminated and the load coping operation of the refrigerating compartment may end.

Hereinafter, the load coping operation of the freezing compartment will be described. When the freezing compartment F is in a load coping condition, the controller 60 may open the freezing compartment damper 32 such that cool air of the deep freezing compartment Z flows into the freezing compartment F, and drive the deep freezing fan 25 (S14). When the freezing compartment damper 32 is opened, cool air from the deep freezing compartment Z may move to the freezing compartment F to flow into the freezing compartment F, thereby rapidly cooling the freezing compartment F by cool air flowing from the deep freezing compartment Z.

When the freezing compartment damper 32 is opened, the deep freezing fan 25 may aid the cool air of the deep freezing compartment Z in flowing more rapidly into the freezing compartment F, and the freezing compartment F may be more rapidly cooled as compared to the case where the deep freezing fan 25 is stopped.

When the freezing compartment damper 32 is opened and the deep freezing fan 25 is driven, some of the cool air of the freezing compartment F may flow into the deep freezing compartment Z and the temperature of the deep freezing compartment Z may increase by cool air that flows from the freezing compartment F into the deep freezing compartment Z.

The controller 60 may stop driving the second compressor 21 according to the temperature sensed by the deep freezing compartment sensor 28 while the freezing compartment damper 32 is opened and the deep freezing fan 25 is driven (S15). The controller 60 may drive the second compressor 21 when the temperature sensed by the deep freezing compartment sensor 28 is above the deep freezing dissatisfaction temperature and stop the second compressor 21 when the temperature sensed by the deep freezing compartment sensor 28 is below the deep freezing satisfaction temperature.

In the above-described control, the load of the freezing compartment F may be rapidly eliminated by cool air flowing from the deep freezing compartment Z and the temperature of the deep freezing compartment Z may be kept at a low temperature. The temperature of the freezing compartment F may reach the freezing compartment satisfaction temperature by opening the freezing compartment damper 32 and driving the deep freezing fan 25, and the controller 60 may close the freezing compartment damper 32 so as not to supercool the freezing compartment F.

In the above-described control, a load caused by opening and then closing the second door 7 may be eliminated and the load coping operation of the freezing compartment may end. When the load coping operation of the refrigerating compartment or the load coping operation of the freezing compartment ends, the controller 60 may control the second compressor 21 and the deep freezing fan 25 according to the temperature of the deep freezing compartment Z. That is, when the load coping operation of the refrigerating compartment/freezing compartment ends, the second freezing cycle C2 may be controlled independently of the first freezing cycle C1.

Figure 5:
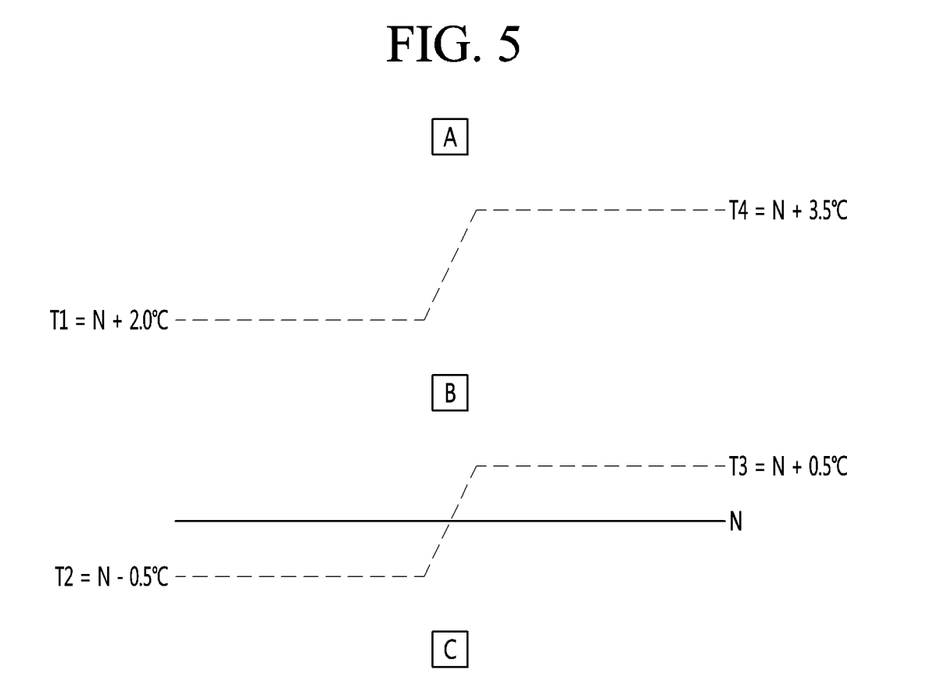
FIG. 5 is a view showing temperature change of a freezing compartment or a refrigerating compartment of the refrigerator according to an embodiment.

FIG. 5 is a view showing temperature change of a freezing compartment or a refrigerating compartment of the refrigerator according to an embodiment. The controller 60 may perform the simultaneous operation when at least one of the temperature of the freezing compartment F and the temperature of the refrigerating compartment R is in an upper limit range. The temperature of the freezing compartment F or the temperature of the refrigerating compartment R may increase or decrease according to load change and the freezing compartment temperature range and the refrigerating compartment temperature range may be divided into an upper limit range A, a dissatisfaction range B and a satisfaction range C.

Hereinafter, for convenience, the freezing compartment F and the refrigerating compartment R are referred to as a storage compartment and the temperature ranges of the freezing compartment F and the temperature ranges of the refrigerating compartment R are referred to as storage compartment temperature ranges A, B and C. A plurality of storage compartment temperature ranges A, B and C may be set based on a target temperature N and may have different entry and release temperatures. Each of the storage compartment temperature ranges A, B and C may have a temperature difference between the entry temperature and the release temperature.

The target temperature N may be a desired temperature. The controller 60 may set the desired temperature as a temperature input by a user through the input 70 as the target temperature N. The controller 60 may determine in which of the storage compartment temperature ranges A, B and C the storage compartment temperature is by the storage compartment temperature and the temperature change pattern (increase or decrease).

The present embodiment may include a plurality of reference temperatures T1, T2, T3 and T4 for distinguishing among these three storage compartment temperature ranges A, B and C. The plurality of in-compartment reference temperatures T1, T2, T3 and T4 may include the first in-compartment reference temperature T1 (upper limit release/dissatisfaction entry temperature) in which the storage compartment temperature T gradually decreases to move from the upper limit range A to the dissatisfaction range B and the second in-compartment reference temperature T2 (dissatisfaction release/satisfaction entry temperature) in which the storage compartment temperature T gradually decreases to move from the dissatisfaction range B to the satisfaction range C.

The first in-compartment reference temperature T1 may be set to be higher than the target temperature N. The storage compartment temperature T may decrease according to load. The decreasing storage compartment temperature T may move from a temperature higher than the first in-compartment reference temperature T1 to the first in-compartment reference temperature T1. In this case, the storage compartment temperature T may move from the upper limit range A to the dissatisfaction range B. For example, the first in-compartment reference temperature T1 may be higher than the target temperature N by 2° C.

The second in-compartment reference temperature T2 may be set to lower than the target temperature N. The storage compartment temperature T may decrease according to load. The decreasing storage compartment temperature T may be lower than the target temperature N and reach the second in-compartment reference temperature T2 lower than the target temperature. In this case, the storage compartment temperature T may move from the dissatisfaction range B to the satisfaction range C. For example, the second in-compartment reference temperature T2 may be lower than the target temperature N by 0.5° C.

The storage compartment temperature N in the satisfaction range C may increase according to load. The plurality of in-compartment reference temperatures T1, T2, T3 and T4 may include the third in-compartment reference temperature T3 (satisfaction release/dissatisfaction entry temperature) in which the storage compartment temperature T in the satisfaction range C gradually moves from the satisfaction range C to the dissatisfaction range B and the fourth in-compartment reference temperature T4 (dissatisfaction release/upper limit entry temperature) in which the storage compartment temperature T gradually increases to move from the dissatisfaction range B to the upper limit range A.

The third in-compartment reference temperature T3 may be set to be higher than the target temperature N. The storage compartment temperature T may increase according to load and the increasing storage compartment temperature T may move from a temperature lower than the third in-compartment reference temperature T3 to the third in-compartment reference temperature T3. In this case, the storage compartment temperature T may move from the satisfaction range C to the dissatisfaction range B. For example, the third in-compartment reference temperature T3 may be higher than the target temperature N by 0.5° C.

The fourth in-compartment reference temperature T4 may be set to be higher than the target temperature N, the first in-compartment reference temperature T1 and the third in-compartment reference temperature T3. The storage compartment temperature T may increase according to load and the increasing storage compartment temperature T may move from a temperature lower than the fourth in-compartment reference temperature T4 to the fourth in-compartment reference temperature T4. In this case, the storage compartment temperature T may move from the dissatisfaction range B to the upper limit range A. For example, the fourth in-compartment reference temperature T4 may be higher than the target temperature N by 3.5° C.

When the temperature of the freezing compartment F is in the upper limit range of the freezing compartment, the controller 60 may open the freezing compartment damper 32 and drive the deep freezing fan 25. In this case, cool air of the deep freezing compartment Z may flow into the freezing compartment F to cool the freezing compartment F.

As described above, when the temperature of the freezing compartment F is in the upper limit range of the freezing compartment, the controller 60 may drive the second compressor 21. The refrigerator may rapidly decrease the temperature of the freezing compartment F while minimizing increase in temperature of the deep freezing compartment.

When the temperature of the refrigerating compartment R is in the upper limit range of the refrigerating compartment, the controller 60 may open the refrigerating compartment damper 33 and drive the deep freezing fan 25. In this case, cool air of the deep freezing compartment Z may flow into the refrigerating compartment R to cool the refrigerating compartment R.

As described above, when the temperature of the refrigerating compartment R is in the upper limit range of the refrigerating compartment, the controller 60 may drive the second compressor 21. The refrigerator may rapidly decrease the temperature of the refrigerating compartment R to the satisfaction range while minimizing increase in temperature of the deep freezing compartment.

The controller 60 may perform the simultaneous operation when a rapid cooling command is input by a user through the input 70. The user may input the rapid cooling command through the input 70 and, when the rapid cooling command is input, the controller 60 may drive the first compressor 11 of the first freezing cycle C1 and the second compressor 12 of the second freezing cycle C2.

The user may input the rapid cooling command of the freezing compartment through the input 70, and the controller 60 may open the freezing compartment damper 32 and drive the deep freezing fan 25. In this case, cool air from the deep freezing compartment Z may flow into the freezing compartment F to cool the freezing compartment F.

As described above, when the rapid cooling command of the freezing compartment is input, the controller 60 may drive the second compressor 21. The refrigerator may rapidly cool the freezing compartment F while minimizing increase in temperature of the deep freezing compartment.

The user may input the rapid cooling command of the refrigerating compartment through the input 70 and the controller 60 may open the refrigerating compartment damper 33 and drive the deep freezing fan 25. In this case, cool air of the deep freezing compartment Z may flow into the refrigerating compartment R to cool the refrigerating compartment R.

As described above, when the rapid cooling command of the refrigerating compartment is input, the controller 60 may drive the second compressor 21. The refrigerator may rapidly cool the refrigerating compartment R while minimizing an increase in temperature of the deep freezing compartment.

Figure 6:
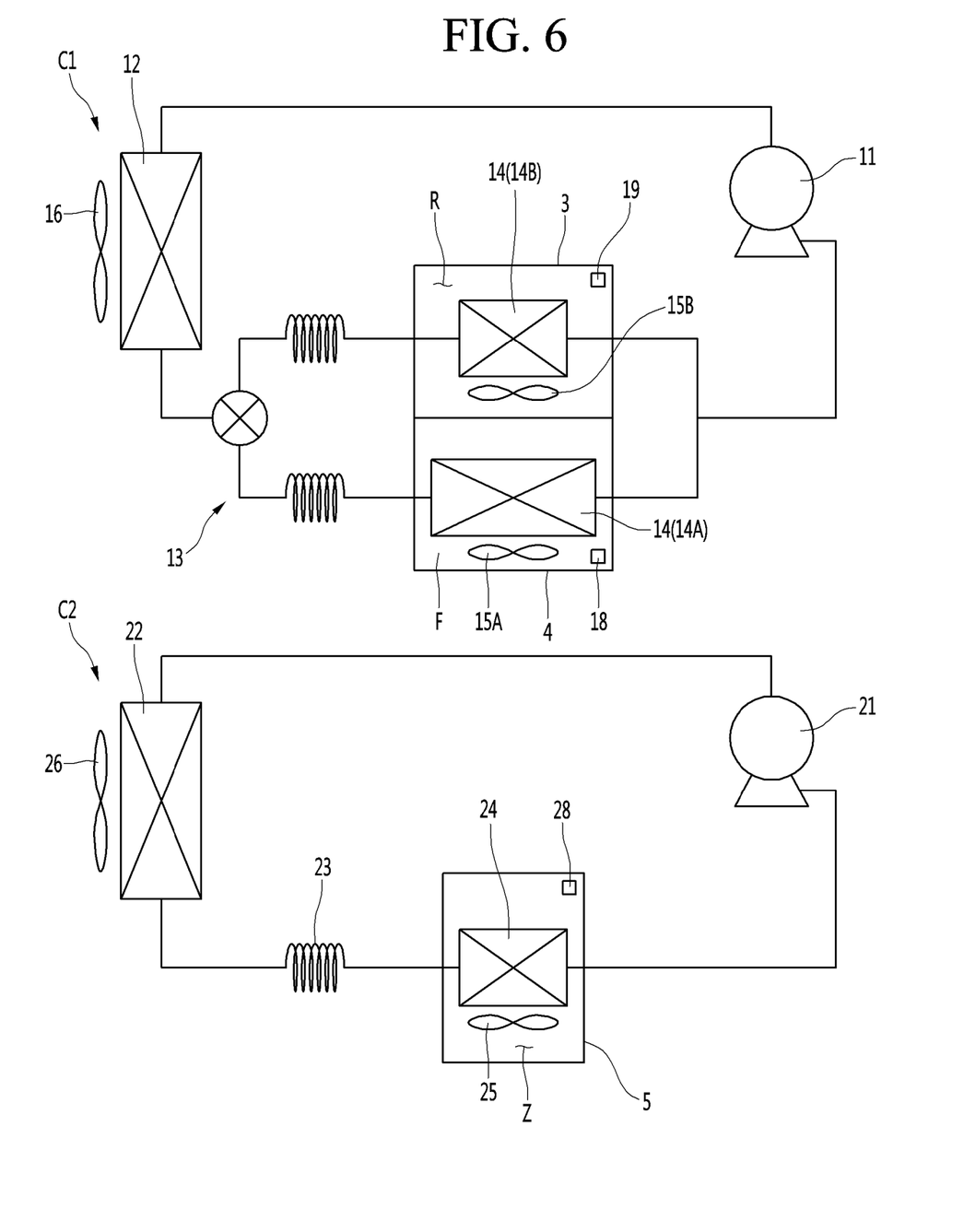
FIG. 6 illustrates a configuration of a refrigerator according to another embodiment.

FIG. 6 is a view showing the configuration of a refrigerator according to another embodiment. The present embodiment is equal or similar to the previous embodiment except that the evaporator 14 of the first freezing cycle C1 may include a freezing compartment evaporator 14A configured to cool the freezing compartment F and a refrigerating compartment evaporator 14*b* configured to cool the refrigerating compartment R, and the freezing compartment F and the refrigerating compartment R may be independently cooled by the evaporators 14A and 14B. The same portions as the first embodiment are denoted by the same reference numerals and a detailed description thereof will be omitted. The first freezing cycle C1 may further include a freezing compartment fan 15A configured to circulate air of the freezing compartment F to circulate between the freezing compartment evaporator 14A and the freezing compartment F and a refrigerating compart fan 14B configured to circulate air of the refrigerating compartment R between the refrigerating compartment evaporator 14B and the refrigerating compartment R.

In the refrigerator, the deep freezing compartment case 5 may be provided in the refrigerating compartment case 3 or the freezing compartment case 4. In this case, the deep freezing compartment case 5 may have a smaller size than the refrigerating compartment case 3 or the freezing compartment case 4. The deep freezing compartment case 5 may be a deep freezing space arranged in the refrigerating compartment case 3 or the freezing compartment case 4. The deep freezing compartment case 5 may be withdrawably provided in at least one of the refrigerating compartment case 3 and the freezing compartment case 4. In this case, the deep freezing compartment case 5 may have the deep freezing compartment Z formed therein and may be a deep freezing drawer which is slidably arranged in the freezing compartment F or the refrigerating compartment R.

In this case, the refrigerator may include a first door 6 configured to open and close the refrigerating compartment R and a second door 7 configured to open and close the freezing compartment F and the deep freezing compartment Z. In addition, in the refrigerator, the heights of the freezing compartment F, the deep freezing compartment Z and the refrigerating compartment R may be different, and the deep freezing compartment Z may be located between the freezing compartment F and the refrigerating compartment R.

In the refrigerator, the freezing compartment, the deep freezing compartment and the refrigerating compartment or the refrigerating compartment, the deep freezing compartment and the freezing compartment may be located in this order in a vertical direction. In this case, the refrigerator may further include a first barrier that partitions the refrigerating compartment R and the deep freezing compartment Z and a second barrier that partitions the deep freezing compartment Z and the freezing compartment F, and the deep freezing compartment Z may be located between the freezing compartment F and the refrigerating compartment R.

In the refrigerator, the refrigerating compartment may be located between the freezing compartment and the deep freezing compartment. In the refrigerator, the freezing compartment, the refrigerating compartment, and the deep freezing compartment; or the deep freezing compartment, the refrigerating compartment, and the freezing compartment may be located in this order in a vertical direction. In this case, the refrigerator may further include a first barrier that partitions the refrigerating compartment R and the deep freezing compartment Z and a second barrier that partitions the refrigerating compartment R and the freezing compartment F, and the refrigerating compartment R may be located between the freezing compartment F and the deep freezing compartment Z.

A refrigerator may include a first freezing cycle having a first compressor, a first condenser, at least one first expansion mechanism, and at least one first evaporator in which a first refrigerant circulates, and configured to cool a freezing compartment and a refrigerating compartment, a freezing compartment sensor configured to sense a freezing compartment temperature, a refrigerating compartment sensor configured to sense a refrigerating compartment temperature, a second freezing cycle having a second compressor, a second condenser, a second expansion mechanism, and a second evaporator in which a second refrigerant circulates, and configured to cool a deep freezing compartment, the second refrigerant being a mixed refrigerant having a lower evaporation temperature than the first refrigerant, a deep freezing compartment sensor configured to sense a deep freezing compartment temperature, and a controller configured to operate the first freezing cycle and the second freezing cycle independently or simultaneously.

When the first and second freezing cycles are operated independently, the controller may operate the first freezing cycle according to the refrigerating compartment temperature sensed by the refrigerating compartment sensor and the freezing compartment temperature sensed by the freezing compartment sensor, and may operate the second freezing cycle according to the deep freezing compartment temperature sensed by the deep freezing compartment sensor. When the first and second freezing cycles are operated simultaneously, the controller may simultaneously operate the first freezing cycle and the second freezing cycle.

A volume of the deep freezing compartment may be less than or equal to a volume of the freezing compartment. A volume of the deep freezing compartment may be less than a volume of the refrigerating compartment. The refrigerator may further include a first barrier configured to partition the freezing compartment and the deep freezing compartment from the refrigerating compartment and a second barrier configured to partition the deep freezing compartment from the freezing compartment.

The refrigerator may further include a freezing compartment damper provided in a freezing compartment circulation passage between the deep freezing compartment and the freezing compartment to open and close the freezing compartment circulation passage. The refrigerator may further include a refrigerating compartment damper provided in a refrigerating compartment circulation passage between the deep freezing compartment and the refrigerating compartment to open and close the refrigerating compartment circulation passage.

The refrigerator may further include a deep freezing fan configured to circulate air in the deep freezing compartment and the second evaporator. If at least one of the freezing compartment and the refrigerating compartment is in a load coping condition, the simultaneous operation may be performed.

If at least one of the freezing compartment temperature and the refrigerating compartment temperature is in an upper limit condition, the simultaneous operation may be performed. If a rapid cooling command is input through an input, the simultaneous operation may be performed.

A method of operating a refrigerator including a first freezing cycle having a first compressor, a first condenser, at least one first expansion mechanism, and at least one first evaporator in which a first refrigerant circulates, and configured to cool a freezing compartment and a refrigerating compartment, and a second freezing cycle having a second compressor, a second condenser, a second expansion mechanism, and a second evaporator in which a second refrigerant circulates, and configured to cool a deep freezing compartment, the second refrigerant being a mixed refrigerant having a lower evaporation temperature than the first refrigerant, may include a first operation mode in which the first freezing cycle and the second freezing cycle are performed independently, and a second operation mode in which the first freezing cycle and the second freezing cycle are performed simultaneously.

The first operation mode may include operating the first freezing cycle according to at least one of the freezing compartment temperature and the refrigerating compartment temperature and operating the second freezing cycle according to the deep freezing compartment temperature. The second operation mode may be performed if at least one of the freezing compartment and the refrigerating compartment is in a load coping condition.

The second operation mode may be performed if at least one of the freezing compartment temperature and the refrigerating compartment temperature is in an upper limit condition. The second operation mode may be performed if a rapid cooling command is input through an input.

Although the preferred embodiments of the present invention have been disclosed for illustrative purposes, those skilled in the art will appreciate that various modifications are possible, without departing from the scope and spirit of the invention as disclosed in the accompanying claims.

The embodiments disclosed in the present invention are therefore to be construed in all aspects as illustrative and not restrictive, and the scope of the present invention is not limited by the embodiments.

The scope of the invention should be determined by the appended claims and their legal equivalents and all changes coming within the meaning and equivalency range of the appended claims are intended to be embraced therein.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:
   a first freezing cycle in which a first refrigerant circulates, the first freezing cycle having a first compressor, a first condenser, at least one first capillary tube, and at least one first evaporator, the first freezing cycle being configured to cool a freezing compartment and a refrigerating compartment;
   a freezing compartment sensor configured to sense the freezing compartment temperature;
   a refrigerating compartment sensor configured to sense the refrigerating compartment temperature;
   a second freezing cycle in which a second refrigerant circulates, the second freezing cycle having a second compressor, a second condenser, a second capillary tube, and a second evaporator, the second freezing cycle being configured to cool a deep freezing compartment, the second refrigerant being a mixed refrigerant having a lower evaporation temperature than the first refrigerant;
   a deep freezing compartment sensor configured to sense the deep freezing compartment temperature, the deep freezing compartment temperature being lower than the freezing compartment temperature;
   a freezing compartment damper provided in a freezing compartment circulation passage between the deep freezing compartment and the freezing compartment and configured to open and close the freezing compartment circulation passage; and
   a refrigerating compartment damper provided in a refrigerating compartment circulation passage between the deep freezing compartment and the refrigerating compartment and configured to open and close the refrigerating compartment circulation passage,
   a controller configured to perform one of;
   (i) independently operate the first freezing cycle according to the refrigerating compartment temperature and the freezing compartment temperature; and the second freezing cycle according to the deep freezing compartment temperature and close the freezing compartment damper and the refrigerating compartment damper when a simultaneous operation condition is not satisfied,
   (ii) simultaneously operate the first freezing cycle and the second freezing cycle and open at least one of the freezing compartment damper or the refrigerating compartment damper when a simultaneous operation condition is satisfied.

2. The refrigerator according to claim 1, wherein a volume of the deep freezing compartment is less than or equal to a volume of the freezing compartment.

3. The refrigerator according to claim 1, wherein a volume of the deep freezing compartment is less than a volume of the refrigerating compartment.

4. The refrigerator according to claim 1, further comprising:
   a first barrier that partitions the freezing compartment and the deep freezing compartment from the refrigerating compartment; and
   a second barrier that partitions the deep freezing compartment from the freezing compartment.

5. The refrigerator according to claim 1, further comprising a deep freezing fan configured to circulate air between the deep freezing compartment and the second evaporator.

6. The refrigerator according to claim 1, wherein, when at least one of the freezing compartment and the refrigerating compartment is in a load coping condition, the simultaneous operation condition is satisfied, and the controller performs the simultaneous operation of the first and second freezing cycles, wherein the load coping condition occurs when a temperature of at least one of the freezing compartment or the refrigerating compartment rises by a predetermined amount within a predetermined amount of time.

7. The refrigerator according to claim 1, wherein, when at least one of the freezing compartment temperature and the refrigerating compartment temperature is in an upper limit condition, the simultaneous operation condition is satisfied, and the controller performs the simultaneous operation of the first and second freezing cycles.

8. The refrigerator according to claim 1, wherein, when a rapid cooling command is input through an input, the simultaneous operation condition is satisfied, and the controller performs the simultaneous operation of the first and second freezing cycles.

9. A method of operating a refrigerator including a first freezing cycle in which a first refrigerant circulates and having a first compressor, a first condenser, at least one first capillary tube, and at least one first evaporator and configured to cool a freezing compartment and a refrigerating compartment, and a second freezing cycle in which a second refrigerant circulates and having a second compressor, a second condenser, a second capillary tube, and a second evaporator and configured to cool a deep freezing compartment, the second refrigerant being a mixed refrigerant having a lower evaporation temperature than the first refrigerant, the deep freezing compartment temperature being lower than a freezing compartment temperature,
- a freezing compartment damper provided in a freezing compartment circulation passage between the deep freezing compartment and the freezing compartment, the freezing compartment damper configured to open and close the freezing compartment circulation passage, and
- a refrigerating compartment damper provided in a refrigerating compartment circulation passage between the deep freezing compartment and the refrigerating compartment, the refrigerating compartment damper configured to open and close the refrigerating compartment circulation passage, the method comprising:
- when a simultaneous operation condition is not satisfied, performing a first operation mode in which the first freezing cycle and the second freezing cycle are operated independently from one another and closing the freezing compartment damper and the refrigerating compartment damper; and
- when the simultaneous operation condition is satisfied, performing a second operation mode in which the first freezing cycle and the second freezing cycle are operated simultaneously and opening at least one of the freezing compartment damper or the refrigerating compartment damper.

10. The method according to claim 9, wherein the first operation mode includes operating the first freezing cycle according to at least one of a freezing compartment temperature and a refrigerating compartment temperature and operating the second freezing cycle according to a deep freezing compartment temperature.

11. The method according to claim 9, wherein the simultaneous operation condition is satisfied when at least one of a freezing compartment or a refrigerating compartment is in a load coping condition.

12. The method according to claim 9, wherein the simultaneous operation condition is satisfied when at least one of a freezing compartment temperature or a refrigerating compartment temperature is in an upper limit condition.

13. The method according to claim 9, wherein the simultaneous operation condition is satisfied when a rapid cooling command is input through an input.

* * * * *